(12) United States Patent
Hyun et al.

(10) Patent No.: US 11,107,198 B2
(45) Date of Patent: Aug. 31, 2021

(54) METHOD AND APPARATUS FOR INCORPORATING NOISE PATTERN INTO IMAGE ON WHICH BOKEH PROCESSING HAS BEEN PERFORMED

(71) Applicant: Samsung Electronics Co., Ltd., Suwon-si (KR)

(72) Inventors: Jongmin Hyun, Suwon-si (KR); Seunghan Lee, Suwon-si (KR); Insung Hwang, Suwon-si (KR); Subash Pandey, Suwon-si (KR); Dasom Lee, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 92 days.

(21) Appl. No.: 16/536,246

(22) Filed: Aug. 8, 2019

(65) Prior Publication Data
US 2020/0051218 A1 Feb. 13, 2020

(30) Foreign Application Priority Data
Aug. 8, 2018 (KR) .................. 10-2018-0092478

(51) Int. Cl.
*G06T 7/194* (2017.01)
*G06T 5/00* (2006.01)
(Continued)

(52) U.S. Cl.
CPC .............. *G06T 5/005* (2013.01); *G06T 5/002* (2013.01); *G06T 7/11* (2017.01); *G06T 7/194* (2017.01);
(Continued)

(58) Field of Classification Search
CPC ........... G06T 5/005; G06T 5/002; G06T 7/50; G06T 7/11; G06T 7/194; G06T 2207/30168; G06T 2207/10028
See application file for complete search history.

(56) References Cited

U.S. PATENT DOCUMENTS

| 8,290,264 B2 | 10/2012 | Kim et al. | |
| 2012/0007942 A1* | 1/2012 | Michrowski | H04N 5/272 348/14.08 |

(Continued)

FOREIGN PATENT DOCUMENTS

| JP | 2007-241424 A | 9/2007 |
| JP | 2007241424 A * | 9/2007 |

(Continued)

OTHER PUBLICATIONS

ISA/KR, International Search Report and Written Opinion of the International Searching Authority, International Application No. PCT/KR2019/009690, dated Oct. 29, 2019, 8 pages.

*Primary Examiner* — Matthew C Bella
*Assistant Examiner* — Kathleen M Broughton

(57) ABSTRACT

Various embodiments disclose a method and apparatus for image correction. The apparatus includes at least one camera, a memory, and a processor. The processor is configured to obtain at least one image corresponding external objects using the at least one camera, identify depth information on the external objects using the at least one image, identify a first region, corresponding to a first external object having a first depth level related to the depth information, and a second region, corresponding to a second external object having a second depth level different from the first depth level. The processor is further configured to generate a first noise pattern by detecting noise included in the first region, perform bokeh processing on at least part of the second region, and generate a corrected image in which the first noise pattern has been at least incorporated into at least part of the bokeh-processed second region.

13 Claims, 14 Drawing Sheets

(51) Int. Cl.
  *G06T 7/50* (2017.01)
  *G06T 7/11* (2017.01)
(52) U.S. Cl.
  CPC ...... *G06T 7/50* (2017.01); *G06T 2207/30168* (2013.01)

(56) References Cited

U.S. PATENT DOCUMENTS

| | | |
|---|---|---|
| 2014/0204111 A1 | 7/2014 | Vaidyanathan et al. |
| 2014/0211034 A1* | 7/2014 | Tanaka ............... H04N 5/23229 348/218.1 |
| 2015/0002545 A1* | 1/2015 | Webster ................ G06T 11/60 345/634 |
| 2015/0356713 A1* | 12/2015 | Tanaka .................... G06T 5/004 382/275 |

FOREIGN PATENT DOCUMENTS

| | | | | |
|---|---|---|---|---|
| KR | 10-0829581 B1 | 5/2008 | | |
| KR | 10-2015-0086333 A | 7/2015 | | |
| KR | 20150086333 A | * | 7/2015 | ............. G06T 5/002 |

\* cited by examiner

[510]

[520]

[530]

[1110]

[1120]

[1130]

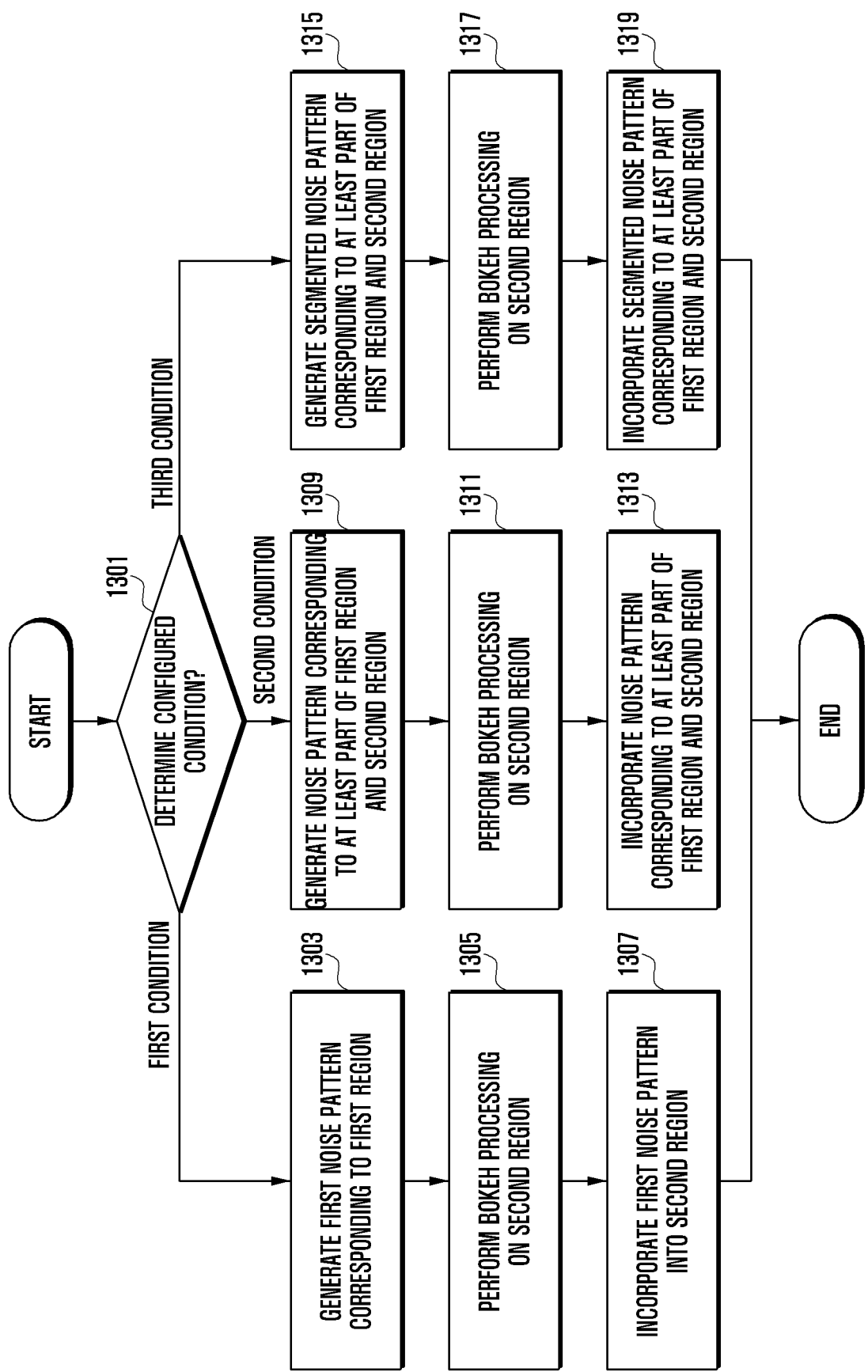

METHOD AND APPARATUS FOR INCORPORATING NOISE PATTERN INTO IMAGE ON WHICH BOKEH PROCESSING HAS BEEN PERFORMED

CROSS-REFERENCE TO RELATED APPLICATION

This application is based on and claims priority under 35 U.S.C. 119 to Korean Patent Application No. 10-2018-0092478 filed on Aug. 8, 2018, the disclosure of which is herein incorporated by reference in its entireties.

BACKGROUND

1. Field

Various embodiments of the disclosure relate to a method and apparatus capable of improving a noise difference between a foreground region on which correction has been processed and a background region to which a bokeh effect has been applied within an image.

2. Description of Related Art

With the development of the digital technology, a variety of types of electronic devices, such as a mobile communication terminal, a personal digital assistant (PDA), an electronic organizer, a smartphone, a table personal computer (PC), and a wearable device, are widely used. A hardware part and/or software part of such an electronic device continues to be improved in order to support and enhance its function.

For example, in the electronic device, camera performance (e.g., a picture element, a wide angle, telephoto, and an optical zoom) in terms of hardware is improved based on user needs, and a technology for correcting (or improving) an image in terms of software is improved. That is, the electronic device adopts an image correction technology as an element to supplement hardware camera performance. Furthermore, a user enjoys culture for communicating with other people through online communities, and thus uploads an image (e.g., a photo or a moving image), including his or her figure, on an online community. In this case, the user corrects the image using various image correction technologies in order to express his or her figure in the image more sharply and beautifully or to express his or her unique figure different from other people.

SUMMARY

A bokeh effect, that is, one of image correction technologies, is to divide one image into a foreground region (e.g., the subject for photography (or user)) and a background region (e.g., regions except the subject for photography) and to blur only the background region. In this case, an electronic device may perform image correction processing on the foreground region while applying a bokeh effect to the background region. The electronic device may have a noise difference between the corrected foreground region and the background region to which the bokeh effect has been applied because noise is removed upon performing the image correction. When a great noise difference occurs, there is a problem in that image quality is degraded.

Various embodiments may disclose a method and apparatus capable of improving a noise difference between a foreground region on which correction has been processed and a background region to which a bokeh effect has been applied within an image.

Various embodiments may disclose a method and apparatus capable of reducing a noise difference between a first region and second region having different depth levels in an image by applying a noise pattern, corresponding to the first region within the image, to the second region to which a bokeh effect has been applied.

According to an embodiment of the disclosure, an electronic device includes at least one camera, a memory, and a processor. The processor may be configured to obtain at least one image corresponding to one or more external objects using the at least one camera, identify depth information on the one or more external objects using the at least one image, identify a first region, corresponding to a first external object having a first depth level related to the depth information, and a second region, corresponding to a second external object having a second depth level different from the first depth level, in the at least one image at least based on the depth information, generate a first noise pattern by detecting noise included in the first region, perform bokeh processing on at least part of the second region, and generate a corrected image in which the first noise pattern has been at least incorporated into at least part of the bokeh-processed second region.

According to an embodiment of the disclosure, an operating method of an electronic device may include obtaining at least one image corresponding to one or more external objects using at least one camera of the electronic device, identifying depth information on the one or more external objects using the at least one image, identifying a first region, corresponding to a first external object having a first depth level related to the depth information, and a second region, corresponding to a second external object having a second depth level different from the first depth level, in the at least one image at least based on the depth information, generating a first noise pattern by detecting noise included in the first region, performing bokeh processing on at least part of the second region, and generating a corrected image in which the first noise pattern has been at least incorporated into at least part of the bokeh-processed second region.

According to an embodiment of the disclosure, an electronic device includes at least one camera, a memory, and a processor. The processor may be configured to split an image into a first region corresponding to a first object having a first depth level and a second region corresponding to a second object having a second depth level different from the first depth level, generate a first noise pattern by detecting noise distributed in the first region, generate a second noise pattern by detecting noise distributed in the second region, perform bokeh processing on at least part of the second region, and generate a corrected image by incorporating the first noise pattern or the second noise pattern into the bokeh-processed second region.

According to various embodiments, a noise difference between a foreground region on which correction processing has been performed and a background region to which a bokeh effect has been applied within an image can be improved.

According to various embodiments, a noise difference between a first region and second region having different depth levels within an image can be reduced by applying a noise pattern, corresponding to the first region within the image, to the second region to which a bokeh effect has been applied, thereby being capable of improving the image.

According to various embodiments, a sense of difference attributable to noise within an image can be reduced by applying a first noise pattern, corresponding to a first region within the image, to a first region and applying a second noise pattern, corresponding to a second region, to the second region, after a bokeh effect is applied to the second region within the image.

According to various embodiments, a sense of difference between a first region and a second region can be reduced by applying a bokeh effect to the second region within the image and then applying a third noise pattern to the first region and the second region within the image.

According to various embodiments, an image can be improved by applying a first split noise pattern to a first region and a second split noise pattern to a second region within the image, after a bokeh effect is applied to the second region within the image.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 13 illustrates a flowchart showing a method of generating a noise pattern according to various embodiments.

DETAILED DESCRIPTION

Figure 1:
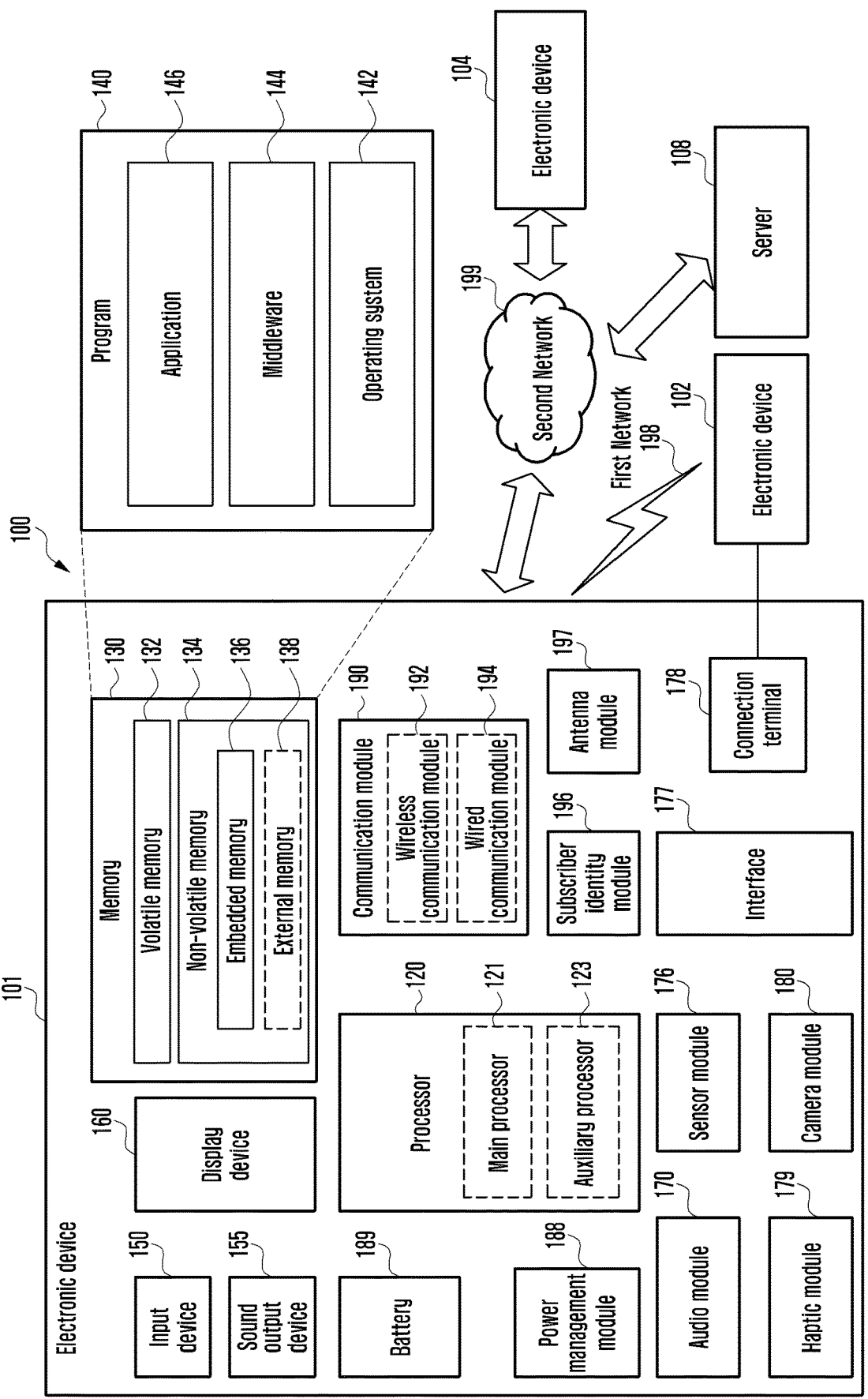
FIG. 1 illustrates a block diagram of an electronic device 101 within a network environment 100 according to various embodiments.

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

FIG. 1 illustrates a block diagram of an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
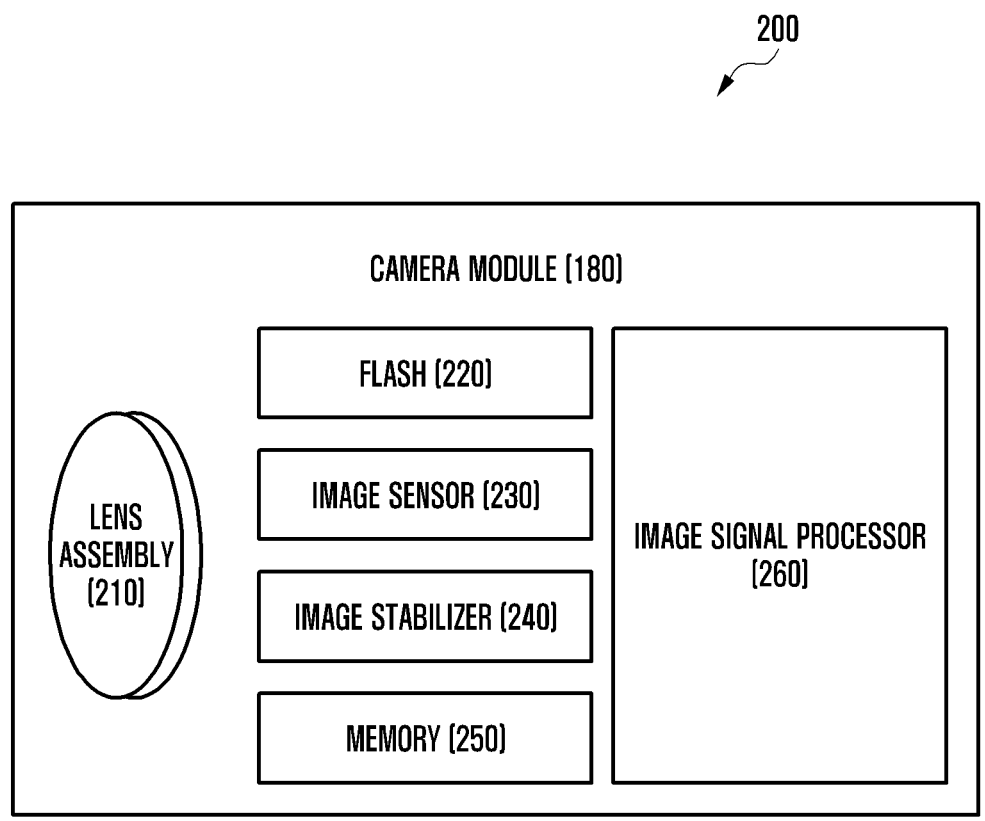
FIG. 2 illustrates a block diagram 200 of a camera module 180 according to various embodiments.

FIG. 2 illustrates a block diagram 200 of the camera module 180 according to various embodiments.

Referring to FIG. 2, the camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display device 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display device 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

Figure 3:
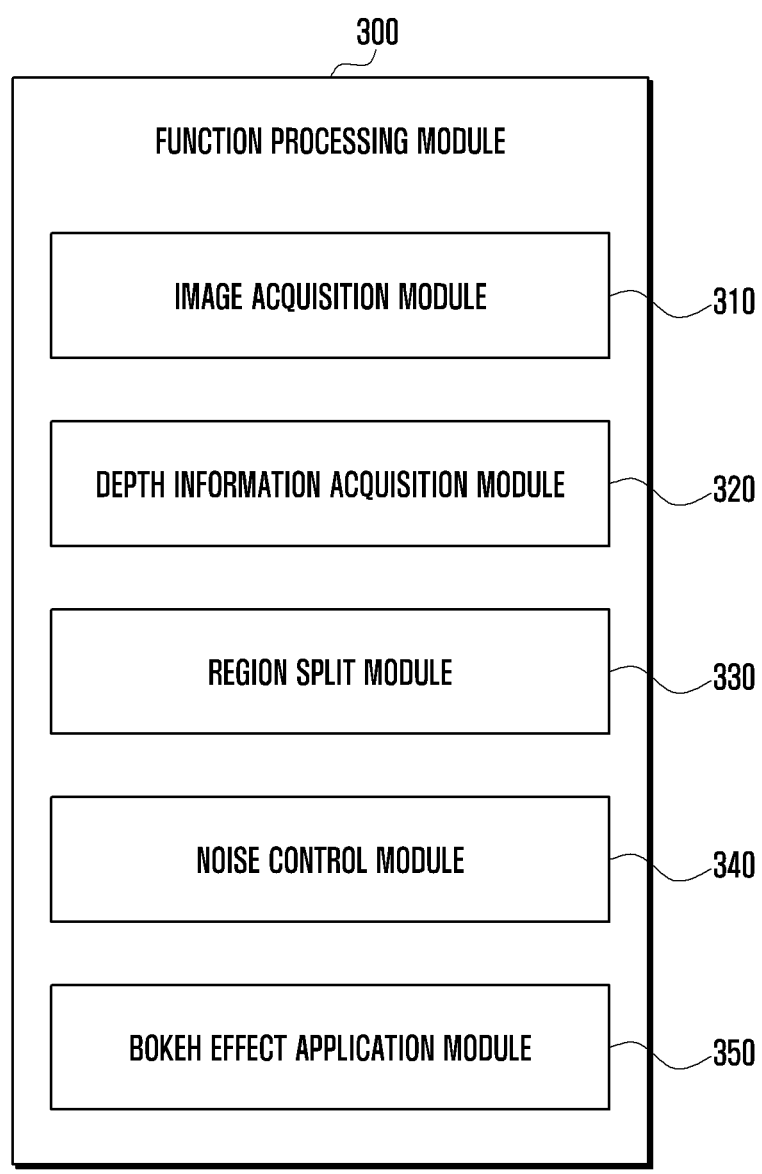
FIG. 3 illustrates a diagram showing an example of the function processing module of the electronic device according to various embodiments.

FIG. 3 illustrates a diagram showing an example of the function processing module of the electronic device according to various embodiments.

Referring to FIG. 3, the function processing module 300 may be included as a hardware module or a software module in a processor (e.g., the processor 120 of FIG. 1) including a processing circuitry. The function processing module 300 may include an image acquisition module 310, a depth information acquisition module 320, a region split module 330, a noise control module 340, or a bokeh effect application module 350.

The image acquisition module 310 may obtain an image captured by the camera (e.g., the camera module 180 of FIG. 1) of an electronic device (e.g., the electronic device 101 of FIG. 1). For example, when a user of the electronic device 101 selects (pushes) a "button for shooting" in the state in which the user has executed a camera application, various image processors (e.g., an image signal processor, a central processing unit, a graphic processing unit, and a digital processing processor) may be activated to generate (or process) an image (or image data). Alternatively, the image acquisition module 310 may obtain an image captured by the camera module 180 by receiving a command (e.g., voice recognition or a gesture), related to photographing, from a user in various manners. The image acquisition module 310 may obtain an image that is being captured, may receive a selected image stored in a memory (e.g., the memory 130 of FIG. 1), or may download an image from an external device (e.g., the electronic device 102, electronic device 104 or server 108 of FIG. 1).

The depth information acquisition module 320 may obtain (or identify) depth information one or more external objects from the obtained image. The depth information (or depth map) is information indicative of the distance in the space, and may indicate perspective information of another point from one point of an image. For example, the depth information acquisition module 320 may obtain one or more images using a dual camera (e.g., the camera module 180 of FIG. 1), and may obtain depth information using the obtained images. A method of obtaining the depth information may be any one of a method using an array camera (e.g., a dual camera (or stereo camera)), a time of flight (TOF) method, or a structure light method. The depth information acquisition module 320 according to various embodiments may obtain the depth information using a software acquisition method using a template or deep learning, or may obtain the depth information by photographing a plurality of images according to different parallaxes (e.g., a long distance and a short distance). In addition, the depth information acquisition module 320 may obtain the depth information using a known technology for obtaining the depth information from an image.

The region split module 330 may split the obtained image into at least two regions. The region split module 330 may detect an object (or external object) having different depth levels (or depth values) at least based on the depth information, and may split a region corresponding to the detected object. For example, the region split module 330 may split the region into a first region (e.g., foreground region), corresponding to a first external object having a first depth level, and a second region (e.g., background region), corresponding to a second external object having a second depth level different from the first depth level, using the depth information. The first external object may be an object (e.g., the subject for photography) located in a first parallax (or the first depth level) within the image. Furthermore, the second external object may be an object (e.g., an object other than the subject for photography) located in a second parallax (or the second depth level). That is, the first depth level may mean that an object is located in the space ahead of the second depth level within an image. For example, a user may be a first external object within an image including the user, and an object other than the user may be a second external object. A method of splitting an image into two region (or two depth levels) and improving the image is described below, but an image may be split into three or more regions and improved.

The noise control module 340 may detect first noise (or first noise pattern) included in the first region. The first noise pattern may mean information on noise distributed in the first region. The noise control module 340 may estimate (or detect) noise included in an image using a parameter estimation method or a non-parametric estimation method. For example, the parameter estimation method is a method of estimating noise using at least one of Gaussian noise, Rayleigh noise, Laplacian noise, gamma noise, exponential noise, uniform noise, or impulse (or salt-and-pepper) noise. For example, the noise control module 340 may estimate noise included in an image by detecting the mean and variation of the noise within the image using Gaussian noise. The non-parametric estimation method is a method of estimating noise by searching for or analyzing similar patches included in an image. The noise control module 340 according to various embodiments may estimate noise using the same method for the entire image (e.g., global noise estimation method) or may estimate noise for each region of an image (e.g., local noise estimation method). The noise control module 340 according to various embodiments may detect noise using a deep learning technology.

The noise control module 340 according to various embodiments may generate the first noise pattern using noise detected in the first region. The noise control module 340 according to various embodiments may split the first region, may detect noise for each split region (e.g., first partial region), and may generate a first split noise pattern using noise detected in each region. The noise control module 340 may detect second noise (or second noise pattern) included in the second region. The noise control module 340 may generate the second noise pattern using noise detected in the second region. The noise control module 340 according to various embodiments may split the second region, may detect noise for each split region (e.g., second partial region), and may generate a second split noise pattern using noise for each region.

The noise control module 340 may generate a corrected image by incorporating the first noise pattern into at least part of a bokeh-processed second region. In the corrected image, the first region may be a region on which image correction processing has been performed, and the second region may be a region into which a bokeh effect and a noise pattern have been incorporated. The noise control module 340 may improve an image by incorporating the first noise pattern into a bokeh-processed image. For example, the noise control module 340 may apply the first noise pattern to the entire bokeh-processed second region. The noise control module 340 may add noise, removed due to bokeh processing, to the second region by incorporating the first noise pattern into the bokeh-processed second region. In this case, the noise control module 340 may make identical the noise levels of the correction-processed first region and the bokeh-processed second region.

The noise control module 340 according to various embodiments may incorporate the first noise pattern into the correction-processed first region, and may incorporate the second noise pattern into the bokeh-processed second region. Alternatively, the noise control module 340 may incorporate the first split noise pattern into the correction-processed first region, and may incorporate the second split noise pattern into the bokeh-processed second region. The noise control module 340 according to various embodiments may determine whether to apply a noise pattern based on a configured condition (e.g., a degree of brightness of an image, a degree of correction of the image, a degree of bokeh processing). For example, the noise control module 340 may not apply a noise pattern to a bokeh-processed image, may apply a noise pattern to only part (e.g., second region) of an image, or may apply a noise pattern to the entire image, based on a configured condition.

The bokeh effect application module 350 may apply (or incorporate) a bokeh effect to the second region. The bokeh effect is also called out of focus, and may mean that a target (e.g., second external object) other than the subject for photography (e.g., first external object) seems to be blurred because the depth is shallow. That is, the bokeh effect application module 350 may perform bokeh processing or light drop bokeh on the second region (e.g., background). If a bokeh effect is applied to the second region, noise (or noise pattern) included (or distributed) the second region may also be removed. The bokeh effect application module 350 according to various embodiments may adjust a degree of bokeh processing, applied to the second region, based on a user input.

An electronic device (e.g., the electronic device 101 of FIG. 1) according to various embodiments of the disclosure includes at least one camera (e.g., the camera module 180 of FIG. 1), a memory (e.g., the memory 130 of FIG. 1), and a processor (e.g., the processor 120 of FIG. 1). The processor 120 may be configured to obtain at least one image corresponding to one or more external objects using the at least one camera, identify depth information on the one or more external objects using the at least one image, identify a first region corresponding to a first external object having a first depth level related to the depth information and a second region corresponding to a second external object having a second depth level different from the first depth level in the at least one image at least based on the depth information, generate a first noise pattern by detecting noise included in the first region, perform bokeh processing on at least part of the second region, and generate a corrected image in which the first noise pattern has been at least incorporated into at least part of the bokeh-processed second region.

The processor may be configured to generate a second noise pattern by detecting noise included in the second region prior to the bokeh processing and to generate the corrected image by incorporating the first noise pattern into at least part of the first region and incorporating the second noise pattern into at least part of the bokeh-processed second region.

The processor may be configured to generate a third noise pattern using noise detected in the first region and noise detected in the second region before the bokeh processing is performed and to generate the corrected image by incorporating the third noise pattern into at least part of the first region or at least part of the bokeh-processed second region.

The processor may be configured to split the first region into a plurality of first partial regions, generate a first split noise pattern by detecting noise included in at least some of the first partial regions, split the second region prior to the bokeh processing into second partial regions, generate a second split noise pattern by detecting noise included in at least some of the second partial regions, and generate the corrected image by incorporating the first split noise pattern into at least part of the first region and incorporating the second split noise pattern into at least part of the bokeh-processed second region.

The processor may be configured to generate a third split noise pattern using noise detected in at least some of a plurality of first partial regions after the first region is split into the first partial regions and noise detected in at least some of second partial regions after the second region prior to the bokeh processing is split into the second partial regions, and to generate the corrected image by incorporating the third split noise pattern into at least part of the first region or at least part of the bokeh-processed second region.

In the corrected image, the first region may be configured as a region on which image correction processing has been performed. The second region may be configured as a region into which a bokeh effect and a noise pattern have been incorporated.

The processor may be configured to generate the corrected image by making different the degree that a noise pattern is incorporated based on a pre-configured (or pre-determined) condition.

The pre-configured condition may include at least one of a degree of brightness of the obtained image, a degree of correction of the obtained image, or a degree of bokeh processing. The processor may be configured to determine the degree that a noise pattern is incorporated based on at least one of the degree of brightness, the degree of correction, or the degree of bokeh processing.

An electronic device (e.g., the electronic device 101 of FIG. 1) according to various embodiments of the disclosure includes at least one camera (e.g., the camera module 180 of FIG. 1), a memory (e.g., the memory 130 of FIG. 1), and a processor (e.g., the processor 120 of FIG. 1). The processor may be configured to split an image into a first region, corresponding to a first object having a first depth level, and a second region, corresponding to a second object having a second depth level different from the first depth level, generate a first noise pattern by detecting noise distributed in the first region, generate a second noise pattern by detecting noise distributed in the second region, perform bokeh processing on at least part of the second region, and generated a corrected image by incorporating the first noise pattern or the second noise pattern into the bokeh-processed second region.

The processor may be configured to determine whether the first noise pattern or the second noise pattern will be incorporated into the bokeh-processed second region based on brightness information included in the image.

The processor may be configured to generate a third noise pattern using noise detected in the first region and noise detected in the second region prior to the bokeh processing and to generate the corrected image by incorporating the third noise pattern into at least part of the first region or at least part of the bokeh-processed second region.

The processor may be configured to generate the corrected image by incorporating the first noise pattern into the first region and incorporating the second noise pattern into the bokeh-processed second region.

The processor may be configured to generate the corrected image by incorporating a first split noise pattern, generated by segmenting the first region, into the first region and incorporating a second split noise pattern, generated by segmenting the second region, into the second region.

The processor may be configured to adjust the degree that a noise pattern is incorporated based on a degree of brightness of the obtained image, a degree of correction of the obtained image, or the degree of bokeh processing.

Figure 4:
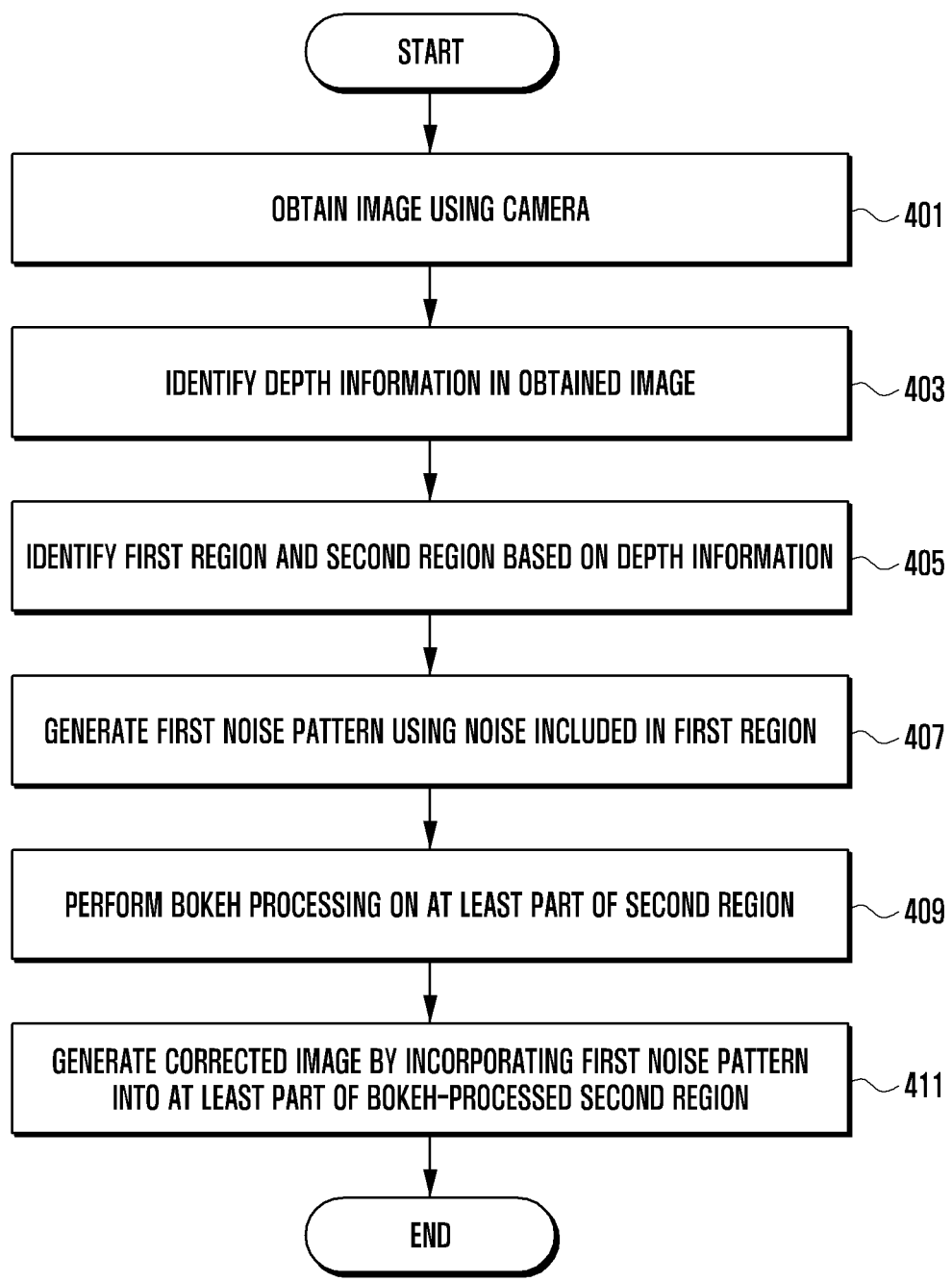
FIG. 4 illustrates a flowchart showing an operating method of the electronic device according to various embodiments.

FIG. 4 illustrates a flowchart showing an operating method of the electronic device according to various embodiments.

Referring to FIG. 4, at operation 401, the processor (e.g., the processor 120 of FIG. 1 or the function processing module 300 of FIG. 3) of an electronic device (e.g., the electronic device 101 of FIG. 1) may obtain an image using a camera (e.g., the camera module 180 of FIG. 1). For example, the processor 120 (e.g., the image acquisition module 310 of FIG. 3) may obtain an image, displayed as a preview image on a display (e.g., the display device 160 of FIG. 1), based on a user input to select a "button for shooting." The processor 120 according to various embodiments may obtain an image by receiving a selected image stored in a memory (e.g., the memory 130 of FIG. 1) or downloading an image from an external device (e.g., the electronic device 102 or the server 108 of FIG. 1).

At operation 403, the processor 120 (e.g., the depth information acquisition module 320 of FIG. 3) may identify depth information in the obtained image. The processor 120 may obtain one or more images using a dual camera (e.g., the camera module 180 of FIG. 1), and may obtain the depth information using the obtained images. The processor 120 according to various embodiments may obtain the depth information in the obtained image using at least one of a method using an array camera, a TOF method, or a structure light method. For example, the method using an array camera may be a method of obtaining depth information using a parallax between images captured by at least two cameras. The TOF method may be a method of obtaining depth information by measuring the time taken for light, output by a TOF sensor (or TOF camera), to be reflected by an object (or external object) and then returned. The structure light method may be a method of obtaining depth information by illuminating a pattern (or an encrypted pattern) in which an infrared illuminator has been configured and interpreting the illuminated pattern using a given algorithm. The processor 120 according to various embodiments may be configured to obtain the depth information using a software acquisition method based on a template or deep learning or to obtain the depth information using one or more images photographed according to different parallaxes (e.g., a long distance, a short distance).

At operation 405, the processor 120 (e.g., the region split module 330 of FIG. 3) may identify a first region and a second region in the obtained image based on the depth information. The processor 120 may detect at least two objects (or external objects) having different depth levels (or depth values) at least based on the depth information, and may split the image into regions in accordance with the detected objects, respectively. For example, the processor 120 may split the image into the first region (e.g., foreground region), corresponding to a first external object having a first depth level, and the second region (e.g., background region), corresponding to a second external object having a second depth level different from the first depth level, using the depth information.

At operation 407, the processor 120 (e.g., the noise control module 340 of FIG. 3) may generate a first noise pattern by detecting noise included in the first region. The first noise pattern may mean information on the noise distributed in the first region. The processor 120 may generate the first noise pattern before or after correction processing is performed on the first region. For example, when image correction processing is performed on the first region, at least some of noise included in the first region can be removed. Accordingly, the processor 120 may generate the first noise pattern corresponding to the first region after it performs image correction processing on the first region.

At operation 409, the processor 120 (e.g., the bokeh effect application module 350 of FIG. 3) may perform bokeh processing on at least part of the second region. The processor 120 may apply a bokeh effect to the remaining regions of the obtained image except the first region. When the bokeh effect is applied to the second region, at least some of noise included in the second region can be removed.

At operation 411, the processor 120 (e.g., the noise control module 340 of FIG. 3) may generate a corrected image by incorporating the first noise pattern into at least part of the bokeh-processed second region. The processor 120 may make identical the noises of the first region and the second region by applying noise, removed due to the bokeh processing, to the second region again. In this case, an image (e.g., corrected image) can be improved because a noise difference between the first region and the second region can be reduced. According to various embodiments, the first region of the corrected image may be a region on which image correction processing has been performed, and the second region of the corrected image may be a region on which a bokeh effect and a noise pattern have been incorporated. Some of the noise of the first region can be removed due to the image correction processing. Likewise, at least some of the noise of the second region can be removed due to the bokeh effect.

Figure 5:
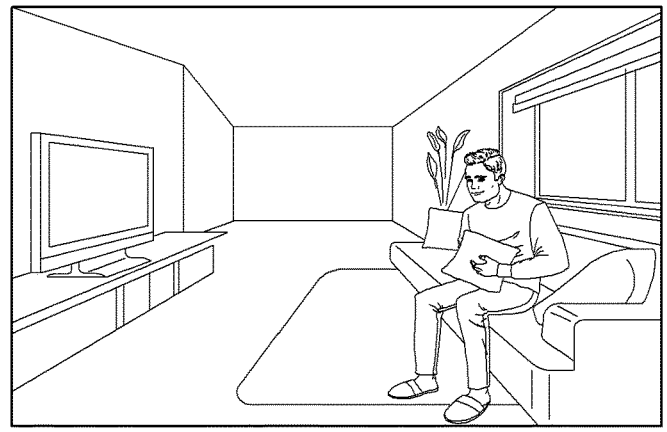
FIG. 5 illustrates a diagram showing an example in which an image is improved according to various embodiments.
Figure 5:
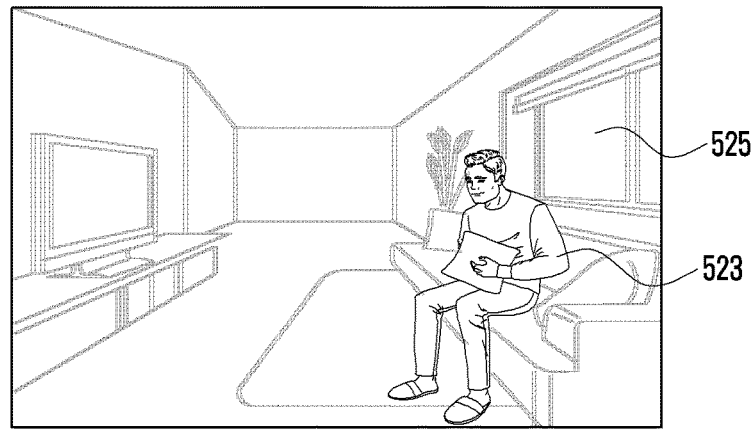
Figure 5:
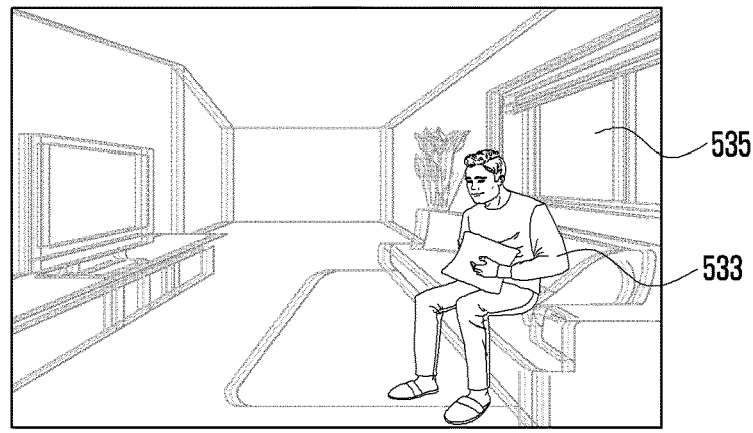

FIG. 5 illustrates a diagram showing an example in which an image is improved according to various embodiments.

Referring to FIG. 5, a first image 510 may be the original image. The original image an image captured by a camera (e.g., the camera module 180 of FIG. 1), an image stored in a memory (e.g., the memory 130 of FIG. 1), or an image downloaded from an external device (e.g., the electronic device 102 or the server 108 of FIG. 1). A second image 520 may be an image obtained by applying a bokeh effect to the second region 525 of the original image. When a bokeh effect is applied to the original image as in a conventional technology, image quality of the second image 520 may seem to be degraded due to a noise difference between the first region 523 (e.g., foreground) and the second region 525 (e.g., background). A third image 530 may be an image obtained by applying a bokeh effect to the background of the original image and simultaneously incorporating a noise pattern. When a bokeh effect is applied to the original image (e.g., the first image 510) (e.g., the second image 520), a noise difference may occur between a first region 523 and the second region 525. The processor 120 may generate the third image 530 by applying a noise pattern, corresponding to a first region 533, to a second region 535 in order to reduce a noise difference between the first region 533 and the second region 535.

Figure 6:
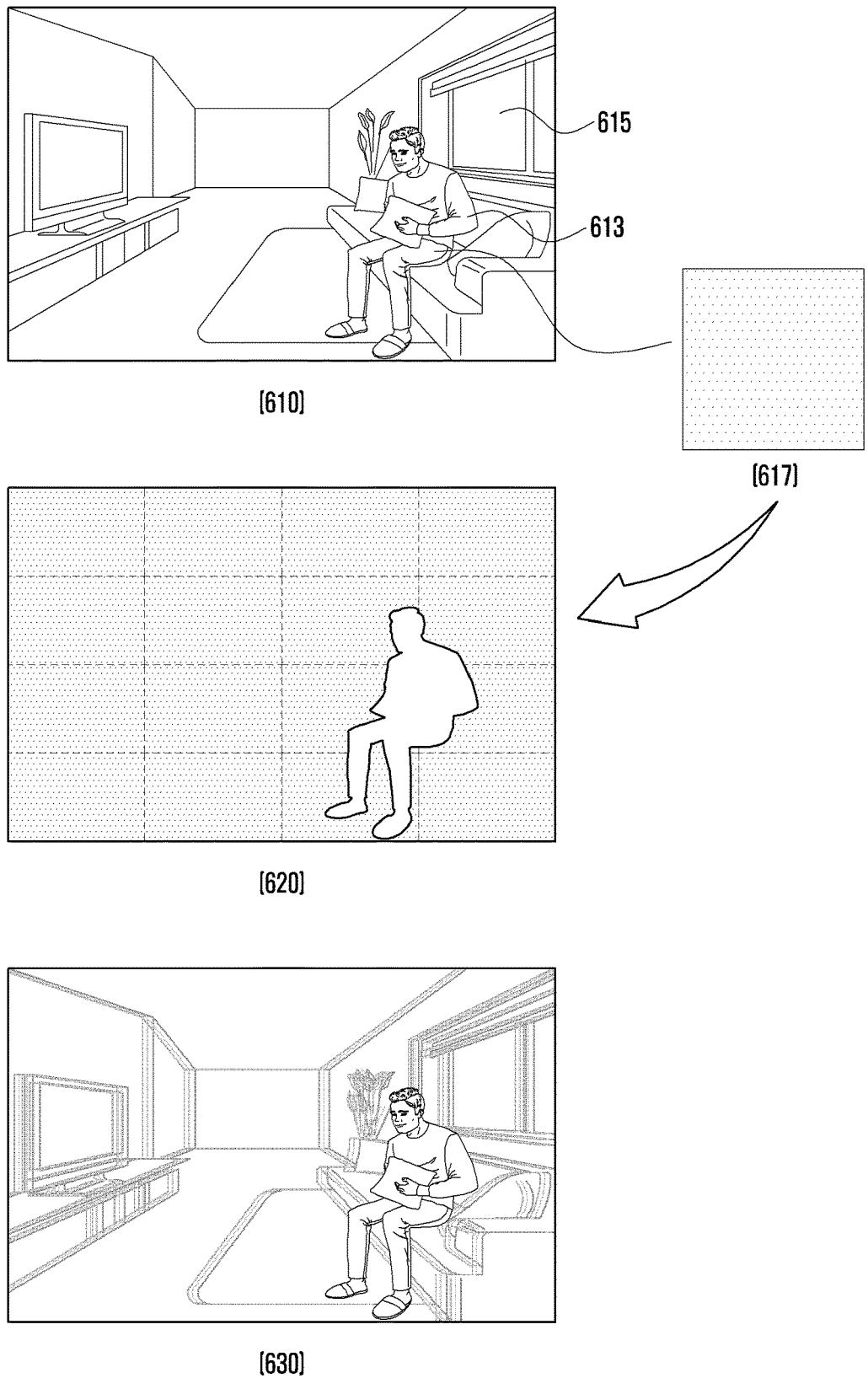
FIG. 6 illustrates a diagram showing an example in which the first noise pattern of a first region is applied to a second region according to various embodiments.

FIG. 6 illustrates a diagram showing an example in which the first noise pattern of a first region is applied to a second region according to various embodiments.

Referring to FIG. 6, the processor 120 (e.g., the noise control module 340 of FIG. 3) may detect noise 617, included in the first region 613 of a first image 610, using a parameter or non-parametric estimation method. For example, the processor 120 may generate a first noise pattern 620 using the mean or variation of the noise 617 distributed in the first region 613. The processor 120 may incorporate the first noise pattern 620 into a second region 615 after it applies a bokeh effect to the first image 610. In the first noise pattern 620, the noise may be applied to the entire second region 615 identically. The processor 120 may generate a corrected image 630 having a reduced noise difference between the first region 613 and the second region 615 by applying the first noise pattern 620 to the second region 615.

Figure 7A:
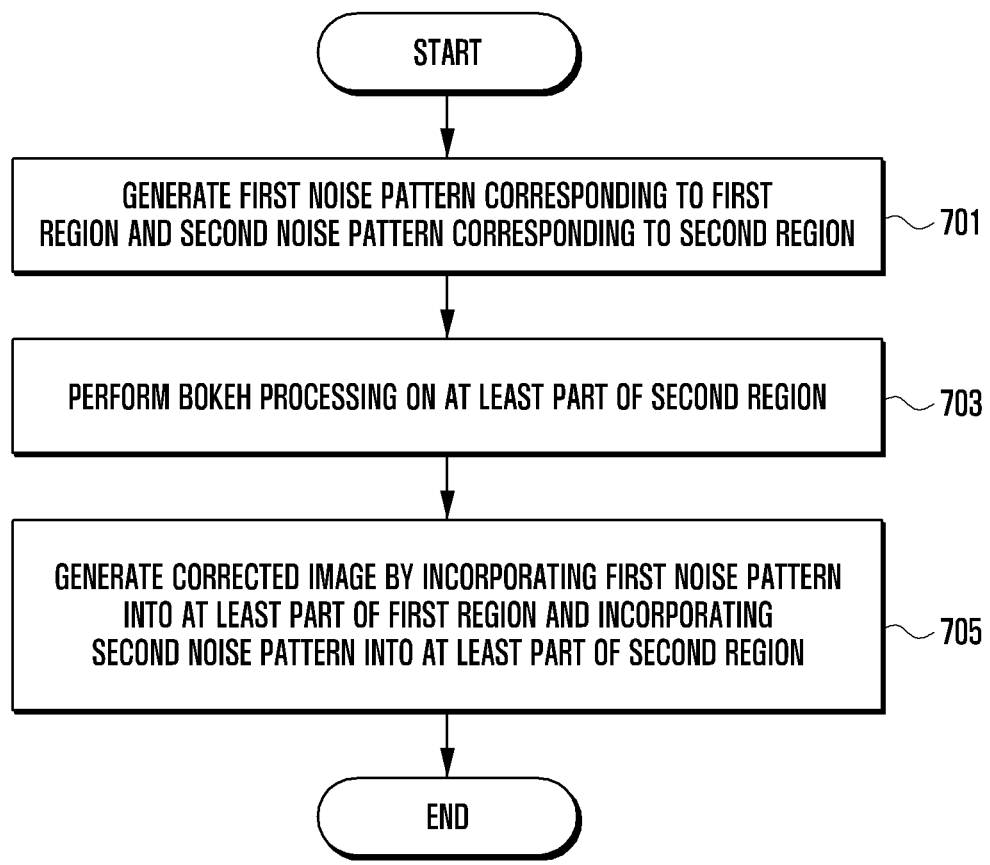
FIG. 7A illustrates a flowchart showing a method of improving an image in an electronic device according to various embodiments.
Figure 7B:
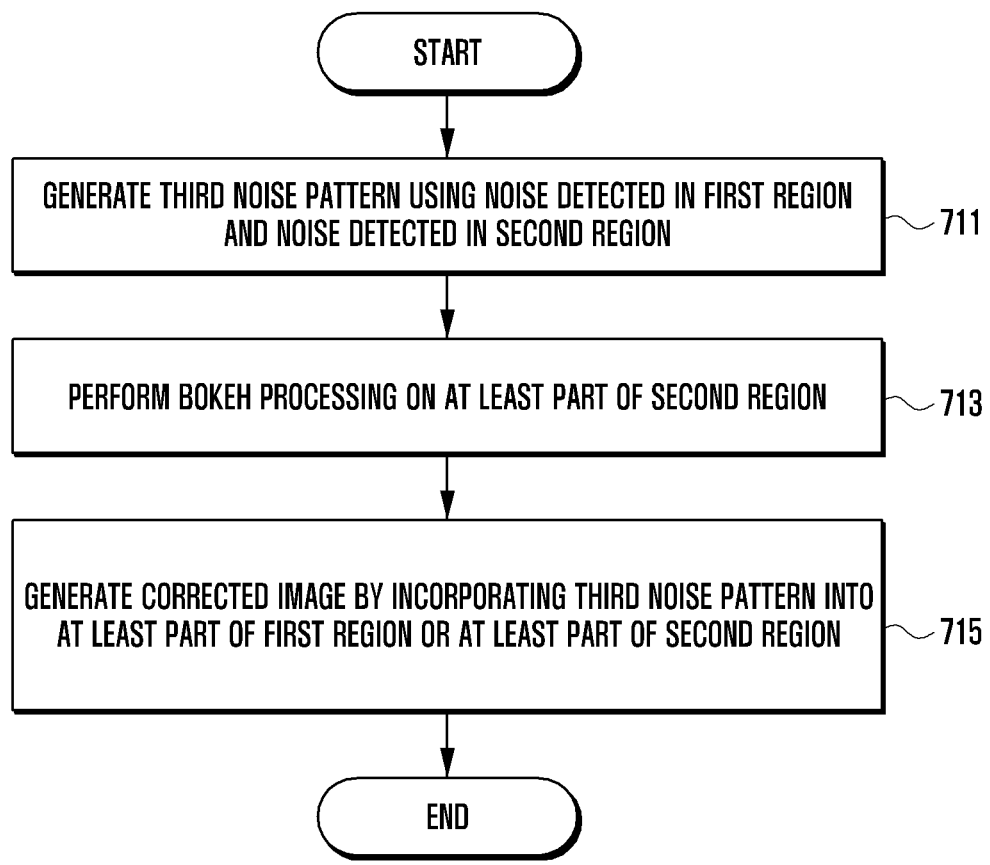
FIG. 7B illustrates a flowchart showing a method of improving an image in an electronic device according to various embodiments.

FIG. 7A illustrates a flowchart showing a method of improving an image in an electronic device according to various embodiments. FIG. 7B illustrates a flowchart showing a method of improving an image in an electronic device according to various embodiments. FIGS. 7A and 7B show other embodiments in which a noise pattern is generated and applied. FIGS. 7A and 7B may be performed after operation 405 of FIG. 4.

FIG. 7A illustrates an example in which a noise pattern is generated.

Referring to FIG. 7A, at operation 701, the processor (e.g., the processor 120 of FIG. 1 or the function processing module 300 of FIG. 3) of an electronic device (e.g., the electronic device 101 of FIG. 1) may generate a first noise pattern corresponding to the first region of an image (e.g., the first image 510), and may generate a second noise pattern corresponding to the second region of the image. The first noise pattern may mean information on noise distributed in the first region, and the second noise pattern may mean information on noise distributed in the second region. The processor 120 (e.g., the noise control module 340 of FIG. 3) may generate the first noise pattern using noise detected in the first region, and may generate the second noise pattern using noise detected in the second region.

At operation 703, the processor 120 (e.g., the bokeh effect application module 350 of FIG. 3) may perform bokeh processing on at least part of the second region. The processor 120 may apply a bokeh effect to the remaining regions of the image (e.g., the first image 510) except the first region. When the bokeh effect is applied to the second region, at least some of the noise included in the second region can be removed.

At operation 705, the processor 120 (e.g., the noise control module 340 of FIG. 3) may generate a corrected image by incorporating a first noise pattern into at least part of the first region and incorporating a second noise pattern into at least part of the second region. The first region of the corrected image may be a region into which image correction processing and the first noise pattern have been incorporated. The second region of the corrected image may be a region into which the bokeh effect and the second noise pattern have been incorporated. Some of the noise of the first region can be removed due to the image correction processing. Furthermore, as in the first region, some of the noise of the second region can be removed due to the bokeh effect. In order to apply natural image correction and a bokeh effect, the processor 120 may apply noise patterns to the first region and the second region, respectively. The processor 120 can reduce a noise difference between the first region and the second region by applying the first noise pattern, removed due to the correction processing, to the first region and applying the second noise pattern, removed due to the bokeh processing, to the second region.

FIG. 7B illustrates another example in which a noise pattern is generated.

Referring to FIG. 7B, at operation 711, the processor (e.g., the processor 120 of FIG. 1 or the function processing module 300 of FIG. 3) of an electronic device (e.g., the electronic device 101 of FIG. 1) may generate a third noise pattern corresponding to the first region and second region of an image (e.g., the first image 510). The third noise pattern may mean information on noise distributed in the first region and noise distributed in the second region. The processor 120 (e.g., the noise control module 340 of FIG. 3) may generate the third noise pattern using noise detected in the first region and noise detected in the second region. When noise patterns are applied to the first region and the second region, respectively, a sense of difference may be present at the boundary portion of the first region and the second region. In order to supplement the sense of difference, the processor 120 may generate a new third noise pattern by comprehensively taking into consideration noise included in the first region and the second region.

At operation 713, the processor 120 (e.g., the bokeh effect application module 350 of FIG. 3) may perform bokeh processing on at least part of the second region. The processor 120 may apply a bokeh effect to the remaining regions of the image (e.g., the first image 510) except the first region. When the bokeh effect is applied to the second region, at least some of the noise included in the second region can be removed.

At operation 715, the processor 120 (e.g., the noise control module 340 of FIG. 3) may generate a corrected image by incorporating the third noise pattern into at least part of the first region or the at least part of the second region. Some of the noise of the first region can be removed due to image correction processing. Furthermore, as in the first region, at least some of the noise of the second region can be removed due to the bokeh effect. The processor 120 can reduce a sense of difference between the first region and the second region by incorporating the third noise pattern, generated by comprehensively taking into consideration the noise included in the first region and the second region, into both the first region and the second region.

The processor 120 according to various embodiments may determine whether to apply different noise patterns (e.g., the first noise pattern and the second noise pattern) to the first region and the second region or whether to apply the same noise pattern (e.g., the third noise pattern) to the first region and the second region, based on based on at least one of a degree of brightness of the obtained image, a degree of correction of the obtained image, or a degree of the bokeh processing.

Figure 8:
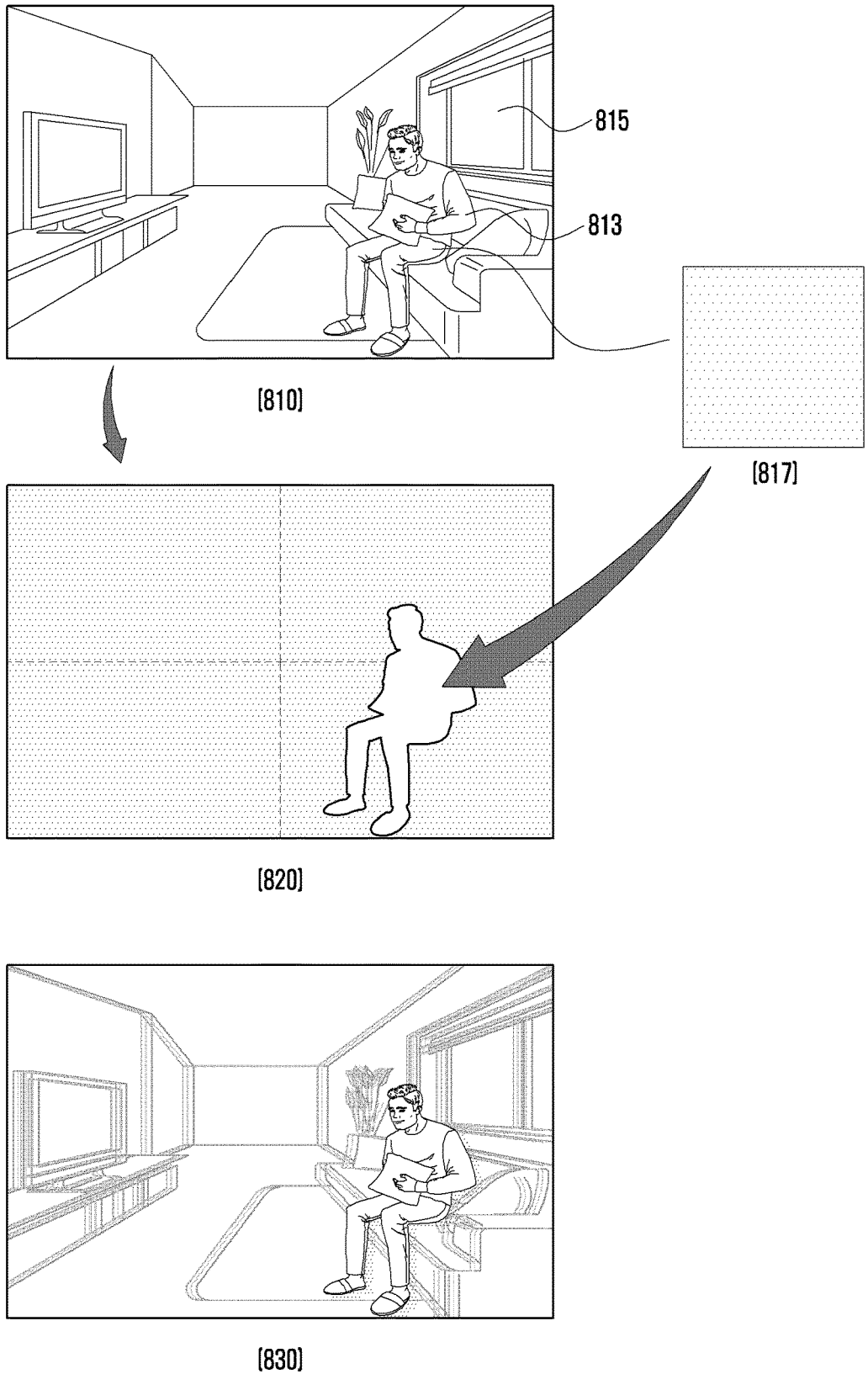
FIG. 8 illustrates a diagram showing an example in which noise patterns are applied to a first region and a second region according to various embodiments.

FIG. 8 illustrates a diagram showing an example in which noise patterns are applied to a first region and a second region according to various embodiments.

Referring to FIG. 8, the processor 120 (e.g., the noise control module 340 of FIG. 3) may generate a first noise pattern 817 by detecting noise, included in the first region 813 of a first image 810, using a parameter or non-parametric estimation method. The processor 120 may generate a second noise pattern 820 by detecting noise included in the second region 815 of the first image 810. The second noise pattern 820 may be configured in a single window form in order to incorporate the same noise to the entire second region 815. According to various embodiments, the second region 815 may have a severe variation of noise for each region. The processor 120 may split the second region 815 into one or more partial regions (e.g., second partial regions), and may generate the second noise pattern 820 using noise detected in each partial region. The second noise pattern 820 may be configured with one or more windows in order to split the second region 815 into smaller regions (e.g., second partial regions) and to incorporate different noise in each region. That is, if one region included in the second region 815 is configured with one window and the second region 815 is split into four regions, four windows may be generated.

For example, when the second region 815 has a larger size than the first region 813, image quality may seem to be degraded if the same noise pattern is applied to the entire second region 815. In this case, the processor 120 may split the second region 815 and generate a second split noise pattern using noise differently detected for each split region. After the processor 120 performs image correction processing on the first region 813 and applies a bokeh effect to the second region 815, it may incorporate the first noise pattern 817 into the first region 813 and incorporate the second noise pattern 820 into the second region 815.

Alternatively, the processor 120 may generate a third noise pattern using noise included in the first region 813 and noise included in the second region 815, may perform image correction processing on the first region 813, and may apply a bokeh effect to the second region 815. Next, the processor may apply the third noise pattern to the first region 813 and the second region 815. If the third noise pattern is applied to the first region 813 and the second region 815, a sense of difference at the boundary part of the first region 813 and the second region 815 can be reduced, compared to the case where different noise patterns are applied to the first region 813 and the second region 815.

Figure 9:
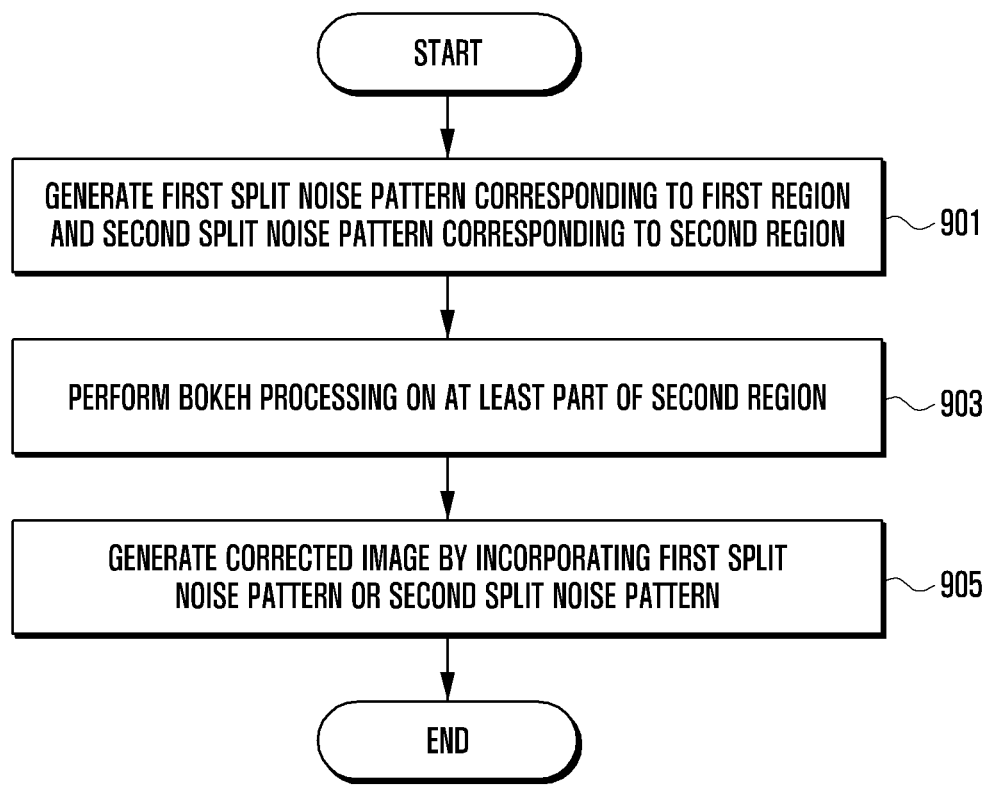
FIG. 9 illustrates a flowchart showing a method of improving an image in an electronic device according to various embodiments.

FIG. 9 illustrates a flowchart showing a method of improving an image in an electronic device according to various embodiments. FIG. 9 illustrates another embodiment in which a noise pattern is detected and applied. FIG. 9 may be performed after operation 405 of FIG. 4.

Referring to FIG. 9, at operation 901, the processor (e.g., the processor 120 of FIG. 1 or the function processing module 300 of FIG. 3) of an electronic device (e.g., the electronic device 101 of FIG. 1) may generate a first split noise pattern corresponding to the first region of an image (e.g., the first image 510), and may generate a second split noise pattern corresponding to the second region of the image. Noise distributed in the image may be influenced by brightness input upon photographing. For example, noise may not be too much in an image when brightness is high (or good), and may be too much in an image when brightness is low (or not good). If noise is too much in an image, a distribution of the noise may be different for each region within one image. The processor 120 may split the first region into regions, may detect noise for each split region (e.g., first partial region), and may generate the first split noise pattern using the detected noise. The processor 120 may segment the second region into regions, may detect noise for each split region (e.g., second partial region), and may generate the second split noise pattern using the detected noise.

At operation 903, the processor 120 (e.g., the bokeh effect application module 350 of FIG. 3) may perform bokeh processing on at least part of the second region. The processor 120 may apply a bokeh effect to the remaining regions of the image (e.g., the first image 510) except the first region.

At operation 905, the processor 120 (e.g., the noise control module 340 of FIG. 3) may generate a corrected image by incorporating the first split noise pattern into the first region and incorporating the second split noise pattern into the second region. If the same noise pattern is applied to the first region and the second region, image quality may seem to be degraded. In order to prevent this, the processor 120 may segment the first region into partial regions, may incorporate the first split noise pattern, differently detected for each partial region (e.g., first partial region), into the first region, may split the second region into partial regions, and may incorporate the second split noise pattern, differently detected for each split region (e.g., second partial region), into the second region. The first region of the corrected image may be a region into which the image correction processing and the first split noise pattern have been incorporated. The second region of the corrected image may be a region into which the bokeh effect and the second split noise pattern have been incorporated.

Some of the noise of the first region can be removed due to the image correction processing. As in the first region, some of the noise of the second region can be removed due to the bokeh effect. In order to apply natural image correction and a bokeh effect, the processor 120 may apply further segmented noise patterns to the first region and the second region, respectively. The processor 120 can reduce a noise difference between the first region and the second region by applying the first split noise pattern, removed due to the correction processing, to the first region and applying the second split noise pattern, removed due to the bokeh processing, to the second region.

The processor 120 according to various embodiments may generate a third split noise pattern using noise, detected in at least some of a plurality of first partial regions obtained by segmenting the first region into the first partial regions, and noise, detected in at least some of second partial regions obtained by segmenting the second region prior to the bokeh processing into the second partial regions. The processor 120 may generate the corrected image by incorporating the third split noise pattern into at least part of the first region or at least part of the bokeh-processed second region.

Figure 10:
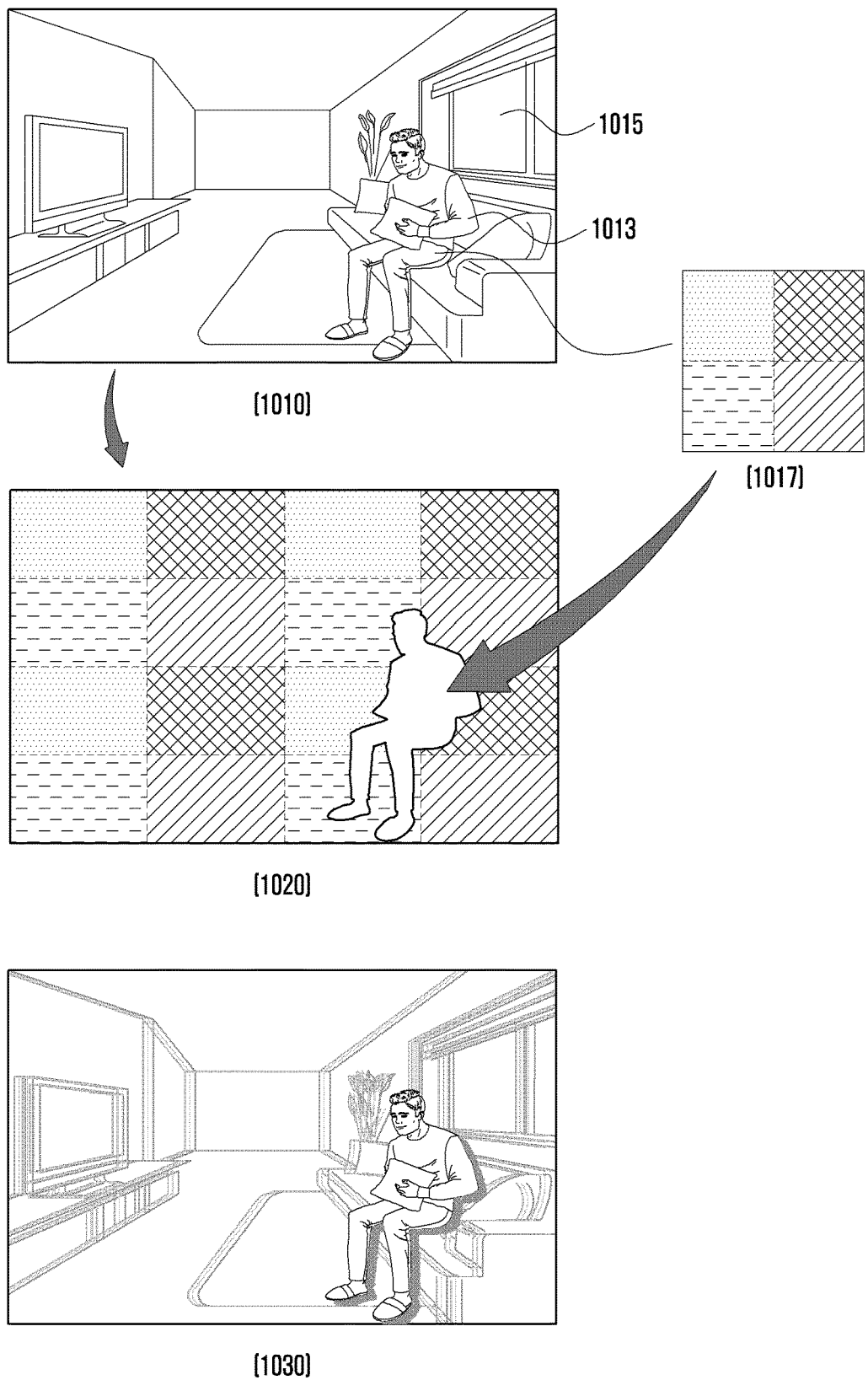
FIG. 10 illustrates a diagram showing an example in which split noise patterns are applied to a first region and a second region according to various embodiments.

FIG. 10 illustrates a diagram showing an example in which split noise patterns are applied to a first region and a second region according to various embodiments.

Referring to FIG. 10, the processor 120 (e.g., the noise control module 340 of FIG. 3) may generate a first split noise pattern 1017 by detecting noise included in the first region 1013 of a first image 1010. The processor 120 may generate a second split noise pattern 1020 by detecting noise included in the second region 1015 of the first image 1010. According to various embodiments, in the first image 1010, a variation of the noise distributed in the first region 1013 or the second region 1015 may be large. The processor 120 may split the first region 1013 into one or more first partial regions, and may generate the first split noise pattern 1017 using noise detected for each split first partial region. The processor 120 may split the second region 1015 into one or more second partial regions, and may generate the second split noise pattern 1020 using noise detected for each split second partial region.

The first split noise pattern 1017 may be generated in a form in which the first region 1013 is split into four first partial regions and a window in which different noise is distributed for each split first partial region is configured. The second split noise pattern 1020 may be generated in a form in which the second region 1015 is split into 12 second partial regions and a window in which different noise is distributed for each split second partial region is configured. The processor 120 can improve performance for image correction processing by incorporating noise differently detected for each region. After the processor 120 performs image correction processing on the first region 1013 and applies a bokeh effect to the second region 1015, the processor may incorporate the first split noise pattern 1017 into the first region 1013 and incorporate the second split noise pattern 1020 into the second region 1015.

Figure 11:
FIG. 11 illustrates a diagram showing an example in which noise pattern intensity is adjusted based on a bokeh effect level according to various embodiments.
Figure 11:
Figure 11:
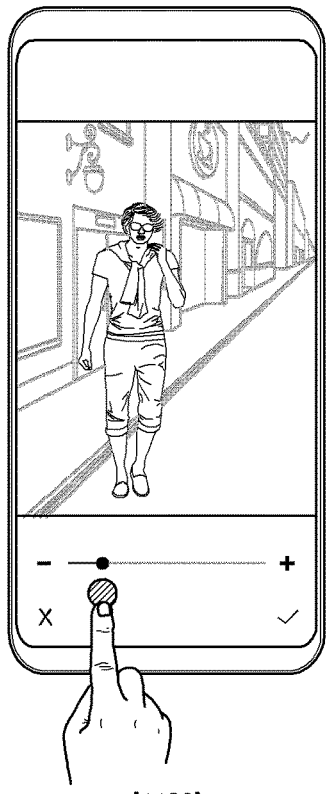

FIG. 11 illustrates a diagram showing an example in which noise pattern intensity is adjusted based on a bokeh effect level according to various embodiments.

Referring to FIG. 11, a first user interface 1110 may include an image 1113 and a bokeh control bar 1115. The image 1113 may be the original image. Alternatively, the image 1113 may be an image obtained by performing correction processing on the foreground region (e.g., first region) of the original image and not performing correction processing on the background region (e.g., second region) thereof. A second user interface 1120 or a third user interface 1130 shows an example in which a bokeh effect (or a degree of bokeh processing) for a background region is differently controlled based on a user input. For example, the second user interface 1120 shows an example in which bokeh processing has been performed on the second region using a first bokeh effect. The third user interface 1130 shows an example in which bokeh processing has been performed on the background region using a second bokeh effect. A more bokeh effect may have been incorporated into the first bokeh effect than into the second bokeh effect. As more bokeh processing is performed, more noise included in the background region may be removed. The processor 120 according to various embodiments may differently incorporate the degree that a noise pattern is incorporated into a foreground region or a background region based on a degree of bokeh processing. For example, the processor 120 may incorporate more of a noise pattern if a large bokeh processing is performed, and may incorporate less of a noise pattern if a smaller bokeh processing is performed, and vice versa. If a large noise pattern is incorporated, more noise may be applied to an image. If a small noise pattern is incorporated, less noise may be applied to an image.

Figure 12:
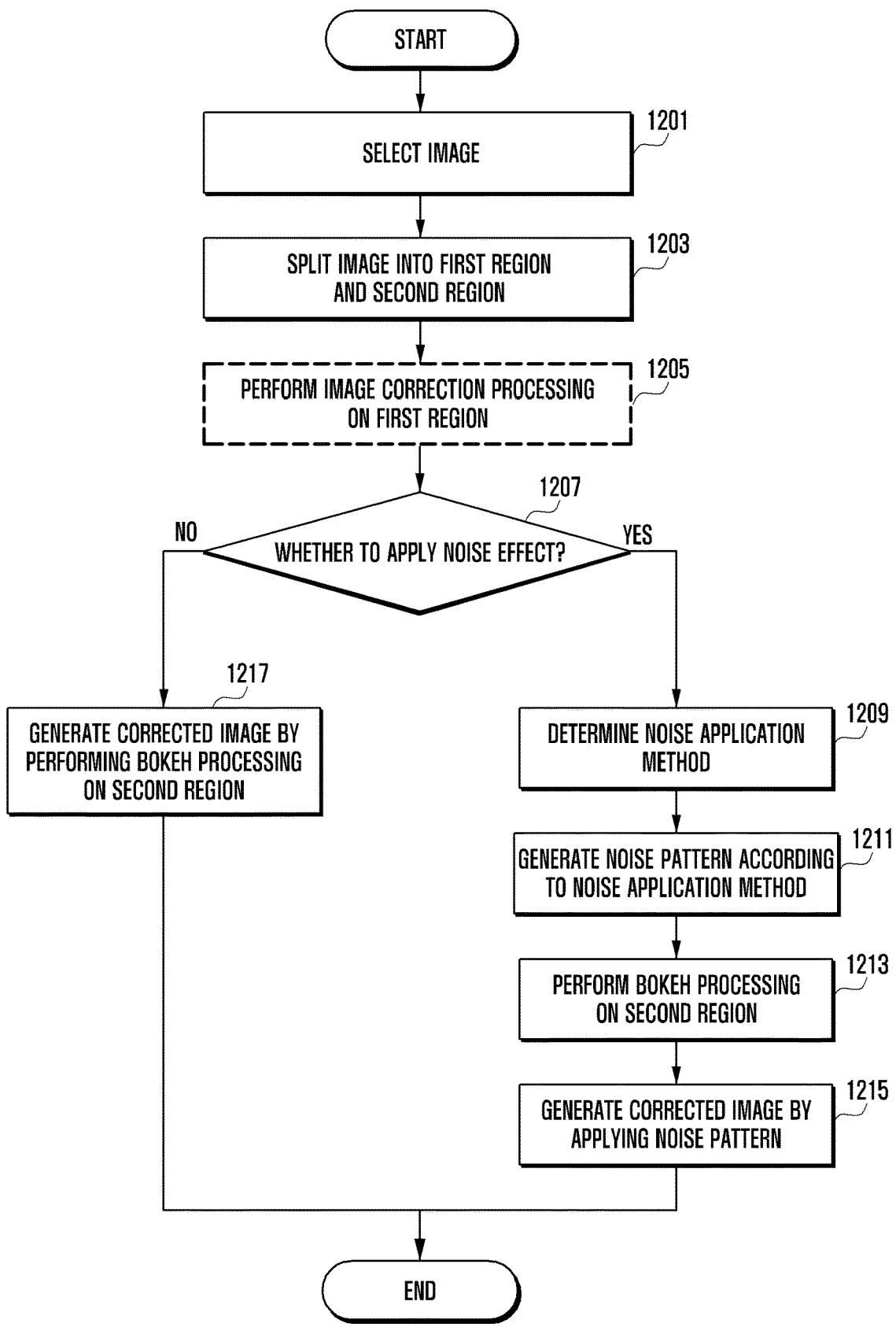
FIG. 12 illustrates a flowchart showing a noise processing method according to the application of a bokeh effect according to various embodiments.

FIG. 12 illustrates a flowchart showing a noise processing method according to the application of a bokeh effect according to various embodiments.

Referring to FIG. 12, at operation 1201, the processor (e.g., the processor 120 of FIG. 1 or the function processing module 300 of FIG. 3) of an electronic device (e.g., the electronic device 101 of FIG. 1) may select an image. The processor 120 (e.g., the image acquisition module 310 of FIG. 3) may receive an image, which is selected based on a user input and to which a bokeh effect will be applied. The selected image may be an image captured by a camera (e.g., the camera module 180 of FIG. 1), an image stored in a memory (e.g., the memory 130 of FIG. 1) or an image downloaded from an external device (e.g., the electronic device 102 or server 108 of FIG. 1).

At operation 1203, the processor 120 (e.g., the region split module 330 of FIG. 3) may split the selected image into a first region and a second region. The processor 120 may obtain (or compute) depth information on the image for region split. The processor 120 may detect objects (or external objects) having different depth levels (or depth values) based on the depth information, and may split a region corresponding to the detected object. For example, the processor 120 may split the image into the first region (e.g., foreground region), corresponding to a first external object having a first depth level, and the second region (e.g., background region), corresponding to a second external object having a second depth level different from the first depth level, using the depth information.

At operation 1205, the processor 120 may perform image correction processing on the first region. The image correction processing may mean processing for making vivid the subject for photography included in the first region or to brightly adjust brightness generally or locally. The processor 120 may perform image correction processing on only the first region of the image. Alternatively, in an embodiment, operation 1205 may be omitted.

At operation 1207, the processor 120 may determine whether to apply a noise effect. The processor 120 may determine whether to apply a noise effect based on a configured condition. The configured condition may include at least one of a degree of brightness of an image, a degree of correction of an image, or a degree of bokeh processing. For example, if brightness of an image is a reference value or more, noise is rarely present in the image. Alternatively, if image correction processing is largely performed on the first region, noise can be removed from the first region. Alternatively, if a bokeh effect has been too much applied to the second region, image quality may seem to be degraded if noise is applied to the second region. The processor 120 may perform operation 1209 if the noise effect is applied, and may perform operation 1217 if the noise effect is not applied.

If the noise effect is applied, at operation 1209, the processor 120 may determine a noise application method. For example, the processor 120 may determine the noise application method based on a degree of brightness of the image or a degree of correction of the image. For example, the processor 120 may determine a first noise application method when brightness of the image is a first reference value or more, may determine a second noise application method when brightness of the image is a second reference value or more, and may determine a third noise application method when brightness of the image is less than the second reference value. The first reference value (e.g., first brightness) may be higher than the second reference value (e.g., second brightness). For example, the processor 120 may determine a first noise application method when a degree of correction of the image is a first correction ratio or more, and may determine a second noise application method or a third noise application method when a degree of correction of the image is less than the first correction ratio.

At operation 1211, the processor 120 may generate a noise pattern according to the determined noise application method. For example, the processor 120 may generate a first noise pattern in accordance with the first region according to a first noise application method. The processor 120 may generate a first noise pattern in accordance with the first region and generate a second noise pattern in accordance with the second region, according to a second noise application method. Alternatively, the processor 120 may generate a third noise pattern in accordance with the first region and the second region according to a second noise application method. The processor 120 may generate a first split noise pattern in accordance with a first partial region, included in the first region, and generate a second split noise pattern in accordance with a second partial region, included in the second region, according to a third noise application method. Alternatively, the processor 120 may generate a third split noise pattern in accordance with the first region and the second region according to a third noise application method.

At operation 1213, the processor 120 (e.g., the bokeh effect application module 350 of FIG. 3) may perform bokeh processing on at least part of the second region. The processor 120 may apply a bokeh effect to the remaining regions of the image (e.g., the first image 510) except the first region.

At operation 1215, the processor 120 (e.g., the noise control module 340 of FIG. 3) may generate a corrected image by applying the noise pattern to the bokeh-processed image. The processor 120 may incorporate the first noise pattern into the second region, may incorporate a noise pattern into at least part of the first region and the second region, or may incorporate a segmented noise pattern into at least part of the first region and the second region.

The processor 120 according to various embodiments may incorporate a noise pattern into at least part of the first region or the second region based on a degree of correction of an image performed on the first region or a degree of bokeh processing incorporated into the second region. For example, the processor 120 may incorporate a noise pattern into both the first region and the second region when a degree of correction of an image of the first region is great, and may incorporate a noise pattern into only the second region when a degree of correction of an image of the first region is small, and vice versa. Alternatively, the processor 120 may incorporate a noise pattern into both the first region and the second region when a degree of bokeh processing incorporated into the second region is great, and may incorporate a noise pattern into only the second region when a degree of bokeh processing incorporated into the second region is small, and vice versa.

The processor 120 according to various embodiments may control the degree that a noise pattern is incorporated based on a configured condition (e.g., a degree of brightness of the obtained image, a degree of correction of the obtained image, or a degree of bokeh processing). In general, if the noise pattern has been incorporated 100%, the processor may incorporate the noise pattern in less than 100% (e.g., 70%, 50%, 30%) based on the configured condition. For example, when brightness of an image is a first reference value or more, the processor may incorporate the degree that a noise pattern is incorporated, which is incorporated into the first region or the second region, small (e.g., less than 30%). When a degree of correction of an image of the first region is large (e.g., a first correction ratio or more), the processor may incorporate the degree that a noise pattern is incorporated, which is incorporated into the first region or the second region, small (e.g., less than 30%). Alternatively, when a degree of bokeh processing incorporated into the second region is large (e.g., a first bokeh processing ratio or more), the processor may incorporate the degree that a noise pattern is incorporated, which is incorporated into the first region or the second region, small (e.g., less than 50%).

If a noise effect is not applied, at operation 1217, the processor 120 (e.g., the bokeh effect application module 350 of FIG. 3) may generate a corrected image by performing bokeh effect processing on the second region. If noise is rarely included in the image (e.g., the original image), the processor 120 may apply only a bokeh effect to the second region and may not apply a separate noise effect.

FIG. 13 illustrates a flowchart showing a method of generating a noise pattern according to various embodiments. FIG. 13 illustrates segmented operations of operation 1209 to operation 1215 of FIG. 12.

Referring to FIG. 13, at operation 1301, the processor (e.g., the processor 120 of FIG. 1 or the function processing module 300 of FIG. 3) of an electronic device (e.g., the electronic device 101 of FIG. 1) may determine a configured condition. The processor 120 may perform at least one of operation 1303, operation 1309, or operation 1315 based on the configured condition.

If the configured condition corresponds to a first condition, at operation 1303, the processor 120 (e.g., the noise control module 340 of FIG. 3) may generate a first noise pattern corresponding to a first region. For example, the processor 120 may perform operation 1303 when a degree of brightness of the image is a first reference value or more.

At operation 1305, the processor 120 (e.g., the bokeh effect application module 350 of FIG. 3) may perform bokeh processing on at least part of a second region.

At operation 1307, the processor 120 (e.g., the noise control module 340 of FIG. 3) may generate a corrected image by incorporating the first noise pattern into the bokeh-processed second region.

If the configured condition corresponds to a second condition, at operation 1309, the processor 120 (e.g., the noise control module 340 of FIG. 3) may generate a noise pattern corresponding to at least part of the first region and the second region. For example, the processor 120 may generate a first noise pattern corresponding to the first region and generate a second noise pattern corresponding to the second region. Alternatively, the processor 120 may generate a third noise pattern corresponding to at least part of the first region and the second region. For example, the processor 120 may perform operation 1303 when a degree of brightness of the image is less than a first reference value to a second reference value or more. Alternatively, the processor 120 may perform operation 1303 when a degree of correction of the image is less than a first correction ratio.

At operation 1311, the processor 120 (e.g., the bokeh effect application module 350 of FIG. 3) may perform bokeh processing on at least part of the second region.

At operation 1313, the processor 120 (e.g., the noise control module 340 of FIG. 3) may generate a corrected image by incorporating a noise pattern corresponding to at least part of the first region and the second region. For example, the processor 120 may generate a corrected image by incorporating a first noise pattern into the first region and incorporating a second noise pattern into the bokeh-processed second region. Alternatively, the processor 120 may generate a corrected image by incorporating a third noise pattern into at least part of the first region and the second region.

If the configured condition corresponds to a third condition, at operation 1315, the processor 120 (e.g., the noise control module 340 of FIG. 3) may generate a segmented noise pattern corresponding to at least part of the first region and the second region. For example, the processor 120 may split the first region into one or more first partial regions, and may generate a first split noise pattern corresponding to each split first partial region. The processor 120 may split the second region into one or more second partial regions, and may generate a second split noise pattern corresponding to each split second partial region. Alternatively, the processor 120 may split the first region and the second region into a plurality of regions, and may generate a third split noise pattern using noise detected in at least some of the split regions.

For example, the processor 120 may perform operation 1303 when a degree of brightness of the image is less than a second reference value or a degree of correction of the image is less than a first correction ratio.

At operation 1317, the processor 120 (e.g., the bokeh effect application module 350 of FIG. 3) may perform bokeh processing on at least part of the second region.

At operation 1319, the processor 120 (e.g., the noise control module 340 of FIG. 3) may generate a corrected image by incorporating a segmented noise pattern corresponding to at least part of the first region and the second region. For example, the processor 120 may generate a corrected image by incorporating a first split noise pattern into the first region and incorporating a second split noise pattern into the bokeh-processed second region. Alternatively, the processor 120 may generate a corrected image by incorporating a third split noise pattern into at least part of the first region and the second region.

An operating method of an electronic device according to various embodiments of the disclosure may include an operation of obtaining at least one image corresponding to one or more external objects using at least one camera of the electronic device, an operation of identifying depth information on the one or more external objects using the at least one image, an operation of identifying a first region, corresponding to a first external object having a first depth level related to the depth information, and a second region, corresponding to a second external object having a second depth level different from the first depth level, in the at least one image at least based on the depth information, an operation of generating a first noise pattern by detecting noise included in the first region, an operation of performing bokeh processing on at least part of the second region, and an operation of generating a corrected image in which the first noise pattern has been at least incorporated into at least part of the bokeh-processed second region.

The method further includes an operation of generating a second noise pattern by detecting noise included in the second region prior to the bokeh processing. The operation of generating the corrected image may include an operation of generating the corrected image by incorporating the first noise pattern into at least part of the first region and incorporating the second noise pattern into at least part of the bokeh-processed second region.

The method further includes an operation of generating a third noise pattern using noise detected in the first region and noise detected in the second region prior to the bokeh processing. The operation of generating the corrected image may include an operation of generating the corrected image by incorporating the third noise pattern into at least part of the first region or at least part of the bokeh-processed second region.

The method further includes an operating of splitting the first region into a plurality of first partial regions and generating a first split noise pattern by detecting noise included in at least some of the first partial regions and an operating of splitting the second region prior to the bokeh processing into second partial regions and generating a second split noise pattern by detecting noise included in at least some of the second partial regions. The operation of generating the corrected image may include an operation of generating the corrected image by incorporating the first split noise pattern into at least part of the first region and incorporating the second split noise pattern into at least part of the bokeh-processed second region.

The operation of generating the corrected image may include an operation of generating the corrected image by making different a degree that a noise pattern is incorporated based on a pre-configured (or pre-determined) condition.

The pre-configured condition includes at least one of a degree of brightness of the obtained image, a degree of correction of the obtained image, or a degree of bokeh processing. The method may further include an operation of determining the degree that the noise pattern is incorporated based on at least one of the degree of brightness, the degree of correction, or the degree of bokeh processing.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device, comprising:
   at least one camera;
   a memory; and
   a processor,
   wherein the processor is configured to:
   obtain at least one image corresponding to one or more external objects using the at least one camera,
   identify depth information of the one or more external objects based on the at least one image,
   identify a first region corresponding to a first external object having a first depth level related to the depth information in the at least one image,
   identify a second region corresponding to a second external object having a second depth level different from the first depth level and related to the depth information in the at least one image,
   generate a first noise pattern based on detecting noise included in the first region,
   generate a second noise pattern based on detecting noise included in the second region prior to performing a bokeh processing,
   perform the bokeh processing on at least part of the second region, and
   generate a corrected image by incorporating the first noise pattern into at least part of the first region and incorporating the second noise pattern into at least part of the bokeh-processed part of the second region.

2. The electronic device of claim 1, wherein in the corrected image, the first region is configured as a region in which image correction processing has been performed, and the second region is configured as a region in which a bokeh effect and a noise pattern have been incorporated.

3. The electronic device of claim 1, wherein the processor is configured to generate the corrected image by varying a degree that a noise pattern is incorporated based on a pre-configured condition.

4. The electronic device of claim 3, wherein:
   the pre-configured condition comprises at least one of (i) a degree of brightness of the obtained at least one image, (ii) a degree of correction of the obtained at least one image, or (iii) a degree of bokeh processing, and
   the processor is configured to determine the degree that the noise pattern is incorporated based on at least one of (i) the degree of brightness, (ii) the degree of correction, or (iii) the degree of bokeh processing.

5. An operating method of an electronic device, comprising:
- obtaining at least one image corresponding to one or more external objects using at least one camera of the electronic device;
- identifying depth information of the one or more external objects based on the at least one image;
- identifying a first region corresponding to a first external object having a first depth level related to the depth information in the at least one image;
- identifying a second region corresponding to a second external object having a second depth level different from the first depth level and related to the depth information in the at least one image;
- splitting the first region into a plurality of first partial regions and generating a first split noise pattern based on detecting noise included in at least some of the plurality of first partial regions;
- splitting the second region into a plurality of second partial regions and generating a second split noise pattern based on detecting noise included in at least some of the plurality of second partial regions prior to performing a bokeh processing;
- performing the bokeh processing on at least part of the second region; and
- generating a corrected image by incorporating the first split noise pattern into at least part of the first region and incorporating the second split noise pattern into at least part of the bokeh-processed part of the second region.

6. The method of claim 5, wherein generating the corrected image comprises generating the corrected image by varying a degree that a noise pattern is incorporated based on a pre-configured condition.

7. The method of claim 6, wherein:
- the pre-configured condition comprises at least one of (i) a degree of brightness of the obtained at least one image, (ii) a degree of correction of the obtained at least one image, or (iii) a degree of bokeh processing, and
- the method further comprises determining the degree that the noise pattern is incorporated based on at least one of (i) the degree of brightness, (ii) the degree of correction, or (iii) the degree of bokeh processing.

8. An electronic device, comprising:
- at least one camera;
- a memory; and
- a processor,
- wherein the processor is configured to:
  - split an image into a first region corresponding to a first object having a first depth level and a second region corresponding to a second object having a second depth level different from the first depth level,
  - perform image correction processing on the first region,
  - determine whether to apply a noise effect,
  - if a noise effect is not applied, generate a corrected image by performing bokeh effect processing on the second region,
  - if the noise effect is applied, determine a noise application method, generate a first noise pattern based on detecting noise distributed in the first region according to the determined noise application method, generate a second noise pattern based on detecting noise distributed in the second region according to the determined noise application method, perform bokeh processing on at least part of the second region, and generate a corrected image by incorporating the first noise pattern or the second noise pattern into the bokeh-processed part of the second region.

9. The electronic device of claim 8, wherein the processor is configured to determine whether to incorporate the first noise pattern or the second noise pattern into the bokeh-processed part of the second region based on brightness information included in the image.

10. The electronic device of claim 8, wherein the processor is configured to:
- generate a third noise pattern based on noise detected in the first region and noise detected in the second region prior to the bokeh processing, and
- generate the corrected image by incorporating the third noise pattern into at least part of the first region or at least part of the bokeh-processed part of the second region.

11. The electronic device of claim 8, wherein the processor is configured to generate the corrected image by incorporating the first noise pattern into the first region and incorporating the second noise pattern into the bokeh-processed part of the second region.

12. The electronic device of claim 8, wherein the processor is configured to generate the corrected image by (i) incorporating a first split noise pattern, the first split noise pattern generated by segmenting the first region, into the first region and (ii) incorporating a second split noise pattern, the second split noise pattern generated by segmenting the second region, into the second region.

13. The electronic device of claim 8, wherein the processor is configured to control a degree that a noise pattern is incorporated based on (i) a degree of brightness of the image, (ii) a degree of correction of the image, or (iii) a degree of bokeh processing.

* * * * *